US005798526A

United States Patent [19]

Shenk et al.

[11] Patent Number: 5,798,526

[45] Date of Patent: Aug. 25, 1998

[54] CALIBRATION SYSTEM FOR SPECTROGRAPHIC ANALYZING INSTRUMENTS

[75] Inventors: John S. Shenk, Port Matilda; Mark O. Westerhaus, State College, both of Pa.

[73] Assignee: Infrasoft International LLC, Port Matilda, Pa.

[21] Appl. No.: 788,259

[22] Filed: Jan. 24, 1997

[51] Int. Cl.$^6$ ..... G01J 3/02

[52] U.S. Cl. ..... 250/339.09; 250/339.12; 356/300; 364/498; 364/571.01; 364/571.04

[58] Field of Search ..... 356/300, 319, 356/326, 328; 250/339.09, 339.12; 364/498, 571.02, 571.04, 571.01

[56] References Cited

U.S. PATENT DOCUMENTS

| | | | |
|---|---|---|---|
| 4,885,697 | 12/1989 | Hubner | 364/498 |
| 5,014,217 | 5/1991 | Savage | 364/498 |
| 5,121,337 | 6/1992 | Brown | 364/498 |
| 5,243,546 | 9/1993 | Maggard | 364/571.02 |
| 5,251,006 | 10/1993 | Honigs et al. | 356/319 |
| 5,311,445 | 5/1994 | White | 364/498 |
| 5,313,406 | 5/1994 | Kauppinen et al. | 364/498 |
| 5,347,475 | 9/1994 | Taylor et al. | 364/571.01 |
| 5,371,358 | 12/1994 | Chang et al. | 250/226 |
| 5,397,899 | 3/1995 | DiFoggio et al. | 250/339.09 |
| 5,448,070 | 9/1995 | Day et al. | 364/498 |
| 5,463,564 | 10/1995 | Agrafiotis et al. | 364/496 |

*Primary Examiner*—F. L. Evans
*Attorney, Agent, or Firm*—Lane, Aitken & McCann

[57] ABSTRACT

In a system for analyzing materials by near infrared analysis, a library of absorbance spectra from sample materials is stored in computer storage. The absorbance spectra of an unknown material is measured and is correlated with the library spectra to select those library spectra which most closely match the spectrum of the unknown material. The selected library spectra are used to determine, by least squares convergence, or by multiple regression, coefficients in equations relating measurable properties of the unknown material to absorbance measurements made on the unknown material.

11 Claims, 2 Drawing Sheets

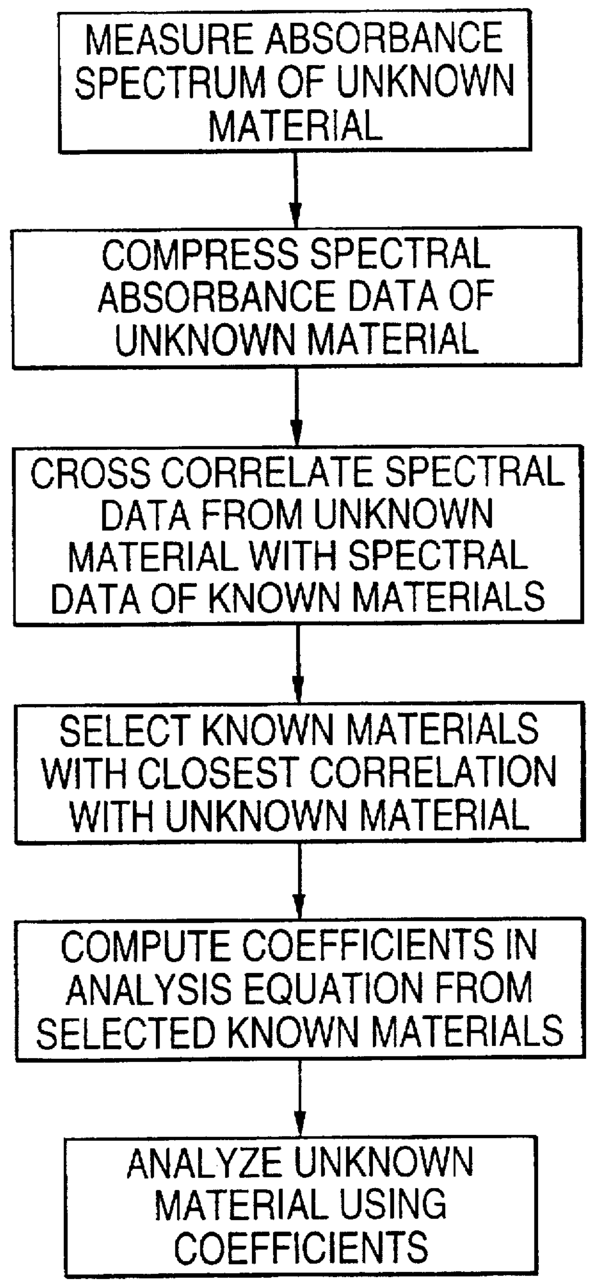
FIG. 2
MEASURE ABSORBANCE SPECTRUM OF UNKNOWN MATERIAL
COMPRESS SPECTRAL ABSORBANCE DATA OF UNKNOWN MATERIAL
CROSS CORRELATE SPECTRAL DATA FROM UNKNOWN MATERIAL WITH SPECTRAL DATA OF KNOWN MATERIALS
SELECT KNOWN MATERIALS WITH CLOSEST CORRELATION WITH UNKNOWN MATERIAL
COMPUTE COEFFICIENTS IN ANALYSIS EQUATION FROM SELECTED KNOWN MATERIALS
ANALYZE UNKNOWN MATERIAL USING COEFFICIENTS

CALIBRATION SYSTEM FOR SPECTROGRAPHIC ANALYZING INSTRUMENTS

This invention relates to a system for analyzing materials and, more particularly, to a system for analyzing materials by infrared analysis.

BACKGROUND OF THE INVENTION

Near infrared spectrographic instruments are used to provide accurate analysis of materials such as to determine measurable characteristics of materials, such as the concentrations of constituents of the materials or characteristics of the materials. For example, near infrared spectrographic instruments are used in agriculture to determine the oil, protein and moisture content of grain, the fat content of meat, the fat, protein and lactose content of milk and the urea content of milk. In addition, the near infrared spectrophotometers are used to analyze blood samples, and to analyze pharmaceutical samples. The instruments also have been used to measure physical properties or physical characteristics of materials. For example, the instruments have been successfully used to measure the hardness of wheat.

In typical systems of the prior art, a measurable characteristic is expected to correlate with absorbance at selected wavelengths in the near infrared spectrum. The measurable characteristic of a material can be represented in an absorbance equation summing products of values from an absorbance spectrum and weighting coefficients or summing products of derivatives of the absorbance spectrum and weighting coefficients. To measure the concentrations of constituents of an unknown sample, the absorbances of a multiplicity of sample materials similar to the unknown material are measured by the spectrographic instrument. The concentrations of the constituents of the sample materials are known. When the unknown material has a property to be measured, such as hardness of wheat, then this property will be known for each of the sample materials. From the absorbance measurements made on the multiplicity of sample materials, the weighting coefficients of the equations relating to the measurable characteristics to the absorbance measurements can be determined by multiple regression or by partial least squares regression. The process of determining the values of the weighting coefficients is called calibration. After the coefficients have been determined, the unknown material can be analyzed by the spectrographic instrument using the coefficients that have been determined from the sample materials.

Instead of measuring the absorbances at selected specific wavelengths which are known or presumed to correlate with the measurable characteristics, the absorbance of the sample materials can be measured at wavelengths distributed throughout the near infrared spectrum and coefficients in equations relating the measurable characteristics to the absorbance measurements can be developed by partial least squares regression. The measurable characteristics of the unknown material can then be determined by the spectrographic instrument by measuring the absorbances of the unknown material and then calculating the measurable characteristics from the measured absorbance values in accordance with the equations.

The above methods of analyzing material, to be accurate, require the sample materials to be similar to the unknown material being measured. However, because the unknown material is in fact unknown, it is sometimes difficult to obtain samples which closely resemble the known material and, as a result, the accuracy of the measurement suffers.

SUMMARY OF THE INVENTION

The present invention provides a new, improved method of calibrating an instrument to determine the coefficients to use in determining measurable characteristics of the unknown material. In accordance with the present invention, a library of near infrared spectra of a large number of sample materials is maintained in computer storage. For example, the spectra from a thousand different sample materials could be maintained in the instrument library. For each of these spectra, the measurable characteristics of the sample materials, to be determined in the unknown material, are known and are stored in computer storage. To provide a set of coefficients to analyze an unknown material, first the near infrared absorbance spectrum of the unknown material is measured and then is compared with the library of spectra of the sample materials to select a subset of spectra which most closely resemble the spectrum measured from unknown material. From this subset of spectra of sample materials, the weighting coefficients of the equations relating the measurable characteristics to the absorbance values are determined. In the preferred embodiment, this determination is carried out by partial least squares regression, but coefficients could also be determined by multiple regression. Once the coefficients have been determined, the measured absorbance spectrum of the unknown material and the equations yield the determinations of the measurable characteristics.

DESCRIPTION OF THE DRAWINGS

FIG. 2 is a flow chart representing the process of the invention.

DESCRIPTION OF THE PREFERRED EMBODIMENT

Figure 1:
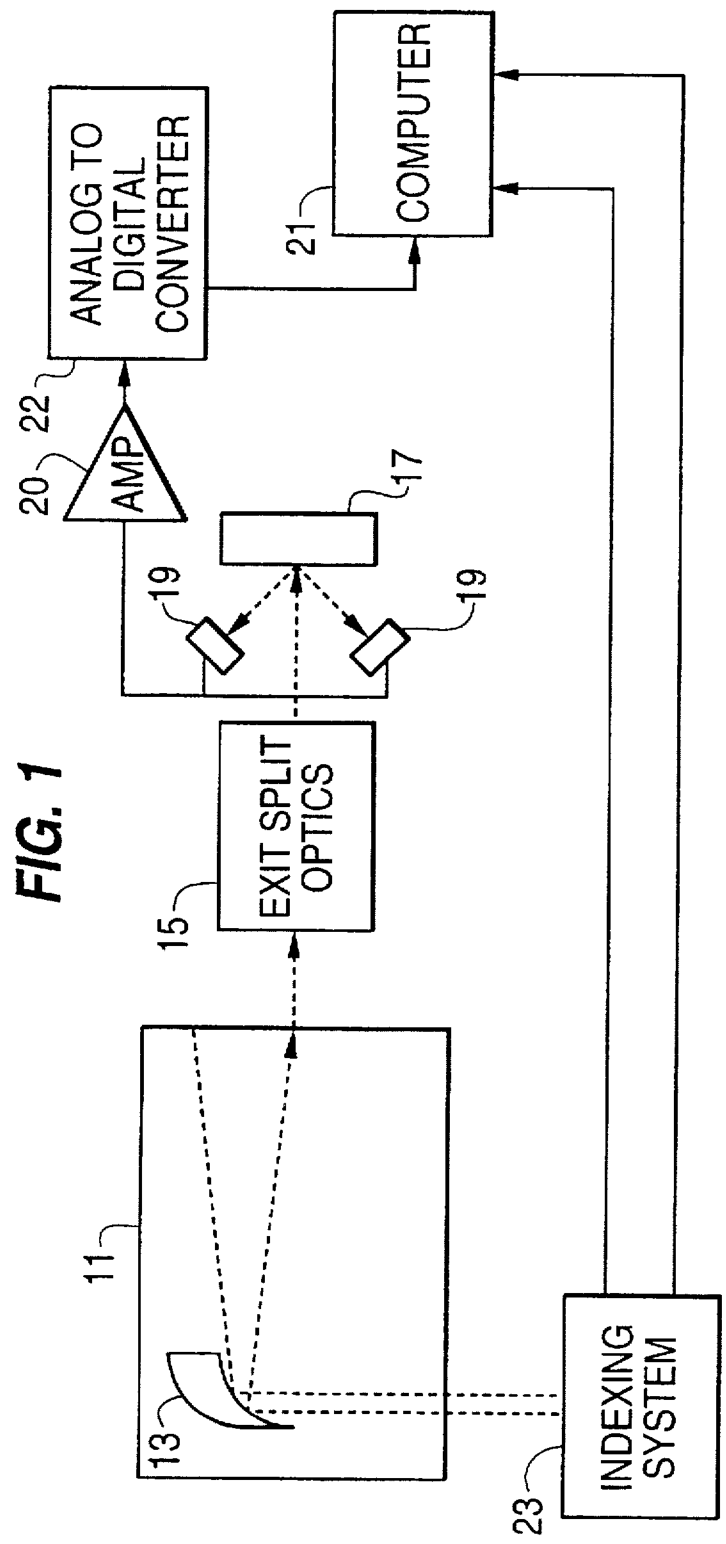
FIG. 1 is a block diagram illustrating the spectrographic instrument employed in the system of the invention.

The apparatus employed in the system of the present invention comprises a near infrared spectrometer 11 having an oscillating grating 13 on which the spectrometer directs light. The grating 13 reflects light with a narrow wavelength band through exit slit optics 15 to a sample 17. As the grating oscillates, the center wavelength of the light that irradiates the sample is swept through the near infrared spectrum. Light from the diffraction grating that is reflected by the sample is detected by near infrared photodetectors 19. The photodetectors generate a signal that is transmitted to an analog-to-digital converter 22 by amplifier 20. An indexing system 23 generates pulses as the grating 13 oscillates and applies these pulses to a computer 21 and to the analog-to-digital converter 22. In response to the pulses from the indexing system 23, the analog-to-digital converter converts successive samples of the output signal of the amplifier 20 to digital values. Each digital value thus corresponds to the reflectivity of the sample at a specific wavelength in the near infrared range. The computer 21 monitors the angular position of the grating 13 and accordingly monitors the wavelength irradiating the sample as the grating oscillates, by counting the pulses produced by the indexing system 23. The pulses produced by the indexing system 23 define incremental index points at which values of the output signal of the amplifier are converted to digital values. The index points are distributed incrementally throughout the near infrared spectrum and each correspond to a different wavelength at which the sample is irradiated. The computer 21 converts each reflectivity value to an absorbance of the material at the corresponding wavelength. The structure and operation of a suitable spectrometer is described in greater detail in U.S. Pat. No. 4,969,739.

In accordance with the present invention, the instrument shown in FIG. 1 is used to measure the absorbance spectra from a large number of sample materials and stores a library of these spectra in the memory of the computer 21. For example, the spectra of known materials may be from a thousand different known products. Associated with each spectrum of a sample material in the computer memory is the concentrations of the constituents of the material and/or the quantification of the property or properties to be measured in the unknown material.

In the preferred embodiment, the absorbance data in the library is compressed by averaging the absorbance values over eight nanometers or in other words by averaging successive groups of four of the measurements taken at the two nanometer increments. Assuming the spectrographic instrument measures the near infrared spectrum from 1100 nanometers to 2498 nanometers, the averaging step reduces the number of data points from 700 to 175.

The flow chart in FIG. 2 illustrates the process employed by the system to analyze an unknown material making use of the library of spectra stored in the computer 21 of the system of FIG. 1.

As shown in FIG. 2, the first step of the process is to measure the absorbance spectrum of the unknown material. This step creates a spectrum of absorbance values distributed throughout the near infrared spectrum at every two nanometers. This data is then compressed by averaging successive sets of four measurements to conform with the compressed data in the library representing the sample materials. Accordingly, the spectral data of the unknown material reduces to 175 data points. This compressed absorbance spectrum is called the target spectrum. To select the spectra in the library most closely resembling the target spectrum, the target spectrum is correlated with each compressed absorbance spectrum of the sample products. To carry out this correlation, the target spectrum is broken into peak regions by identifying local minima in the curve represented by the target spectrum. The computer program searches for all spectral values lower than two of the neighboring spectral values to find each minimum. A peak region is defined as the region from one local minimum up to, but not including, the next local minimum. To carry out the correlation for each peak region, the target spectrum is mean centered, that is, the average of the data points is found and then each spectral data point is represented by the difference between this average and the value of each data point. The data in each of the sample material spectra are also mean centered in the same manner. The mean centered data are represented as vectors x and y. The squared correlation between the mean centered vector x representing the unknown material and the mean centered vector y representing a sample material is defined as $(\Sigma xy)\cdot(\Sigma xy)/[(\Sigma xx)\cdot(\Sigma yy)]$. In the computer program, the product sums $\Sigma xy$, $\Sigma xx$ and $\Sigma yy$ are computed for each peak region. These sums are then pooled into three grand sums, $\Sigma\Sigma xy$, $\Sigma\Sigma xx$, $\Sigma\Sigma yy$. When the sums from all the peak regions have been summed into grand sums, the pooled correlation is computed as:

$$(\Sigma\Sigma xy)\cdot(\Sigma\Sigma xy)/[(\Sigma\Sigma xx)\cdot(\Sigma\Sigma yy)].$$

This pooled correlation is computed between the target spectrum and each library spectrum. Those library spectra which have the highest correlation with the target spectrum are selected as the library spectra to be used to compute the weighting coefficients to carry out the analysis of the unknown material. In the preferred embodiment, any spectrum of a sample material which perfectly correlates with the unknown sample is not used in the calibration. This allows testing the program with spectra contained in the library. A minimum acceptable correlation may be specified to prevent sample materials with low correlations from being used in the calibration process. In addition, a minimum number of known materials having acceptable correlation can be specified. If this minimum number is not achieved, the analysis is not performed. In the appendix hereto, the program listing entitled SIMILAR.C is the source code in C of the program for correlating the target spectrum with the library spectra to select those spectra in the library which most closely, but not perfectly, match the target spectrum.

Instead of using the above method to select the spectra representing the known materials which most closely match the target spectrum, the method disclosed in application Ser. No. 08/645,104, filed May 13, 1996, by Xiaolin Chen and Stephen L. Monfre, may be used to select the spectra of the sample materials which most closely match the unknown material. Other methods of selecting the spectra of the sample materials which closely match the unknown material spectrum may also be used.

Assuming that the analysis of the unknown material is to measure concentrations of constituents in the unknown material, the analysis of the material may be represented by a set of equations or models, such as:

$$C_1 = k_{11}A_1 + k_{12}A_2 + k_{13}A_3 + \ldots k_{1n}A_n$$

$$C_2 = k_{21}A_1 + k_{22}A_2 + \ldots k_{2n}A_n$$

$$C_3 = k_{31}A_1 + k_{32}A_2 + \ldots k_{3n}A_n$$

$$\vdots \qquad \vdots$$

$$C_m = k_{m1}A_1 + k_{m2}A_2 + \ldots k_{mn}A_n$$

In these equations, $C_1$ through $C_m$ are the estimated percentage concentrations of the constituents being measured. $A_1$ through $A_n$ are the values of the target spectrum and $k_{11}$ through $k_{mn}$ are weighting coefficients to be determined by the system of the present invention. In accordance with the present invention, the absorbance spectra representing those sample materials in the library of spectra of sample materials which are selected as those most closely resembling the target spectrum of the unknown material are used to determine the coefficients $k_{11}$ through $k_{mn}$ by partial least squares regression (PLS). In the preferred embodiment, models are derived sequentially with from 1 to a specified maximum number of factors for each constituent being measured. Each model can be used to predict the constituent value of the unknown sample material. In the preferred embodiment a minimum number of factors is specified. The final predicted constituent value of the unknown material is a weighted average of the individual model predicted values with from the minimum to the maximum number of factors $Y=\Sigma(y_i w_i)/\Sigma w_i)$, where Y is the final predicted constituent value, the $y_i$ values are the predicted values from the PLS models, and the $w_i$ are the inverse of the sum of squared target sample spectrum residuals. Large coefficients are associated with overfitting, and should be avoided. Small residuals mean that more of the target spectrum variation has been modeled by PLS. These residuals are natural by-product of the PLS algorithm. In the appendix, the source code listing (in C) entitled MY_PLS.C represents the program carrying out the partial least squares determination of the weighting coefficients and final constituent values. As described above, the unknown material are then calculated making use of these coefficients and the values of the target spectrum in the equations for $C_1$ through $C_m$. In this manner, the unknown material is analyzed to determine the percentages of its constituents.

Instead of analyzing the material by partial least squares, the coefficients equations relating the percentage constituents to absorbance spectrum values can be determined by multiple regression. When multiple regression is used, the absorbance values at specific selected wavelengths known to correlate with the constituents being measured are selected and these specific wavelengths are used in multiple regression equations.

In a similar manner, a property or properties of the unknown material can be determined. In order to determine physical properties of the material, the properties of the sample materials corresponding to the spectra in the library must be known and are stored in the computer memory. From these quantified physical properties of the sample materials, the coefficients of equations relating the properties to the spectrum values can be determined in the same manner as for the constituent percentages as described above.

If the target spectrum of the unknown material does not closely resemble or is not well represented in the library of spectra, then the target spectrum is added to the library with the measurable characteristics determined by the analysis so that the new spectrum can be used in measuring of a future material.

In the above description, the library spectra and the target spectra are described as absorbance spectra, which are determined as log 1/R of the reflectance measurements R. Instead of operating on the undifferentiated absorbances values, the first derivative of the spectrum of absorbance values may be determined and the process applied to the set of first derivative values, which is also called an absorbance spectrum. When a target spectrum in the form of first derivative values is correlated with the library spectra, the target spectrum is divided into peak regions by searching for all spectra locations with a positive first derivative followed immediately by a negative first derivative value. This sequence indicates a local minimum in the non-differentiated absorbance spectrum of log (1/R) values. The peak regions in the first derivative spectrum extending between these local minima in the undifferential target spectrum are correlated with first derivatives of the sample spectra as described above in connection with the log (1/R) absorbance spectra.

The instrument of the invention is described above as making reflectance measurements to determine the absorbance, log (1/R), spectra. The absorbance spectra may also be determined from transmittance measurements of T wherein the absorbance is log (1/T).

As described above, the system of the invention analyzes an unknown material from its absorbance spectrum. Absorbance measurements are used because they generally are proportional to concentrations of constituents or properties of the material. It will be apparent that the system is applicable to representations of the reflectance or transmission measurements in other forms. These and many other modifications may be made to the above-described specific embodiments of the invention, without departing from the spirit and scope of the invention, which is defined in the appended claims.

SIMILAR.C

```
#define FLOAT double
#define MISSING 0.0
#define ROUNDUP(n) (((n-1)|127)+1)
#define MALLOC_STUFF

#include <assert.h>
#include <conio.h>
#include <ctype.h>
#include <dos.h>
#include <fcntl.h>
#include <float.h>
#include <io.h>
#include <math.h>
#include <signal.h>
#include <sys\stat.h>
#include <stdio.h>
#include <stdlib.h>
#include <string.h>
#include "fileio.h"
#include "make_eig.h"
#include "my_pls.h"

float *msc_mean;      // pointer to array of msc target (usually an average spectrum)
float *msc_weights;   // pointer of array of msc weights (for weighted msc)

typedef struct {
        double r2;
        short int index;
        short int fill[3];
} rr_struct;

typedef struct {
        double value;
        int index;
} values;

typedef struct {
        general_fileheader header;
        instrument_header insthdr;
```

```
        constituent_array vnames;
        sample_header samhdr;
        float *od;
        float chems[MAXCONSTITS];
        sample_no_rec *sample_nos;
        char filename[_MAX_PATH];
        int handle, od_read_size, record_read_size;
} cal_file_struct;

int Argc;
char **Argv;

static int got_lib_od_and_chems;
static float **lib_od_and_chems;
static sample_no_rec *lib_sample_nos;

static double **x;      // pointer to array[][] to hold spectral data
static double *y;       // pointer to array[] to hold constituent data
static int ns, nod, nv, nuse, nlose;
static cal_file_struct lib_file;
int Ivar, Max_samps, Min_samps, Minimum_factors, Samples_per_factor, Correlate_by_peaks,
Scatter;
int Ider, Gap, Smooth, Nave, Nuse, Use_wavelength_weights, Use_sample_weights,
Max_elim_passes, Full_output;
float R_sq_cutoff, Ssx_factor, Y2_factor, Cutoff_ratio;
char anl_name[80];
int anl_handle;
double sumwt, ybar, ysd;

general_fileheader header, anl_header;
anl_sample sample_rec;

void ctrl_c_handler (int signum)
/*******************************************************************************
Inputs:
int signum - code specifying reason for signal.
Notes:
Install at program start as signal(SIGINT, ctrl_c_handler) to ignore ^C.
*******************************************************************************/
{
        static int count = 0;
        if(signum == SIGINT) signal(SIGINT, ctrl_c_handler);
        if(++count > 1) exit(3);
```

```
}

void fp_error_handler (int signum)
/******************************************************************************
Inputs:
int signum - code specifying reason for signal.
Notes:
Install at program at start as signal(SIGFPE, fp_error_handler) to ignore
floating point errors.
******************************************************************************/
{
	if(signum == SIGFPE) _fpreset();
	signal(signum, fp_error_handler);
}

#ifdef MALLOC_STUFF
void *my_malloc(size_t _size)
/******************************************************************************
Inputs:
size_t _size - size of space (in number of bytes) to be allocated.
Returns:
void pointer to the allocated memory.
Notes:
If the requested memory cannot be allocated, complain and exit the program.
******************************************************************************/
{
	void *ptr;
	ptr = malloc(_size);
	if(ptr == NULL) {
		printf("No more free memory\n");
		exit(1);
	}
	return(ptr);
}

void my_free(void *_block)
/******************************************************************************
Inputs:
void *_block - pointer to a previously allocated block of memory.
******************************************************************************/
{
	free(_block);
}
```

```
#endif

void get_filename(char prompt[], char fname[], char ext[], int icode)
/******************************************************************************
Inputs:
char prompt[] - text string to prompt used for a filename
char ext[] - file extension to add if user doesn't input one.
int icode - desired return code from access(fname, CHECK_FOR_EXISTENCE).
        - 0 if the file should already exist, -1 for a new filename.
Outputs:
char fname[] - filename.
Notes:
This routine first checks for unused command line arguments, and quietly
tries to use one if available. If the user hits Enter with no input, the
program exits.
******************************************************************************/
{
        int first_time;

        first_time = 1;
        do {
                if(first_time && Argc) {
                        strcpy(fname, *Argv);
                        Argc--;
                        Argv++;
                        first_time = 0;
                } else {
                        printf(prompt);
                        if(gets(fname) == NULL) exit(1);
                        if(fname[0] == 0 || (unsigned int)fname[0] == 0xff) exit(1);
                }
                if(strchr(fname, '.') == NULL) strcat(fname, ext);
        } while(access(fname, 0) != icode);
}

int my_open_cal_file(char *filename, cal_file_struct *file_ptr)
/******************************************************************************
Inputs:
char *filename - name of ISI file to be opened.
cal_file_struct *file_ptr - pointer to structure containing file info.
Returns:
1 if successful, -1 if open fails, -2 on a read error.
Notes:
```

The file is opened, the file headers are read, and arrays needed for further processing are allocated.

```
******************************************************************************/
{
        int n;
        file_ptr->handle = open(filename, O_RDWR|O_BINARY);
        if(file_ptr->handle <= 0) {
                return(-1);
        }
        strcpy(file_ptr->filename, filename);
        read(file_ptr->handle, &file_ptr->header, sizeof(file_ptr->header));
        read(file_ptr->handle, &file_ptr->insthdr, sizeof(file_ptr->insthdr));
        n = read(file_ptr->handle, &file_ptr->vnames, sizeof(file_ptr->vnames));
        if(n != sizeof(file_ptr->vnames)) {
                close(file_ptr->handle);
                return(-2);
        }
        file_ptr->od_read_size = ROUNDUP(file_ptr->header.no_datapoints*sizeof(float));
        file_ptr->record_read_size = sizeof(file_ptr->samhdr) + file_ptr->od_read_size +
sizeof(file_ptr->chems);
        file_ptr->od = (float *)my_malloc(file_ptr->od_read_size);
        file_ptr->sample_nos = (sample_no_rec
*)my_malloc(file_ptr->header.samples*sizeof(sample_no_rec));
        return(1);
}

void my_close_cal_file(cal_file_struct *file_ptr)
/******************************************************************************
Inputs:
cal_file_struct *file_ptr - pointer to structure containing file info.
Notes:
The file is closed and memory arrays are freed.
******************************************************************************/
{
        my_free(file_ptr->sample_nos), file_ptr->sample_nos = NULL;
        my_free(file_ptr->od), file_ptr->od = NULL;
        close(file_ptr->handle), file_ptr->handle = -1;
}

int my_read_next_sample(cal_file_struct *file_ptr, int i)
/******************************************************************************
Inputs:
cal_file_struct *file_ptr - pointer to structure containing file info.
```

```
int i - index (starting at zero) of the next sample to be read.
Returns:
1 for success, 0 on read error.
Globals:
static int got_lib_od_and_chems;      // 1 if the file has been read and stored
                                                          // in lib_od_and_chems, 0
otherwise.
static float **lib_od_and_chems;      // array[ns][nod+32] to store datafile.
static sample_no_rec *lib_sample_nos;
Notes:
If got_lib_od_and_chems == 0, read the file and store the spectra and chemical
values in lib_od_and_chems.
If got_lib_od_and_chems != 0, copy the spectra and chemical values from
lib_od_and_chems.
******************************************************************************/
{
        int n, iret;

        if(got_lib_od_and_chems == 0) {
                do {
                        read(file_ptr->handle, &file_ptr->samhdr, sizeof(file_ptr->samhdr));
                        read(file_ptr->handle, file_ptr->od, file_ptr->od_read_size);
                        n = read(file_ptr->handle, file_ptr->chems, sizeof(file_ptr->chems));
                } while(file_ptr->samhdr.delete_flag);
                memcpy(lib_od_and_chems[i], file_ptr->od,
file_ptr->header.no_datapoints*sizeof(float));
                memcpy(lib_od_and_chems[i]+file_ptr->header.no_datapoints, file_ptr->chems,
32*sizeof(float));
                strcpy(lib_sample_nos[i].sample_no, file_ptr->samhdr.sample_no);
                lib_sample_nos[i].sequence = file_ptr->samhdr.sequence;
                lib_sample_nos[i].delete_flag = file_ptr->samhdr.delete_flag;
                iret = (n == sizeof(file_ptr->chems));
        } else {
                memcpy(file_ptr->od, lib_od_and_chems[i],
file_ptr->header.no_datapoints*sizeof(float));
                memcpy(file_ptr->chems, lib_od_and_chems[i]+file_ptr->header.no_datapoints,
32*sizeof(float));
                strcpy(file_ptr->samhdr.sample_no, lib_sample_nos[i].sample_no);
                file_ptr->samhdr.sequence = lib_sample_nos[i].sequence;
                file_ptr->samhdr.delete_flag = lib_sample_nos[i].delete_flag;
                iret = 1;
        }
        return(iret);
```

```
}

int my_read_sample_i(cal_file_struct *file_ptr, int i)
/*******************************************************************************
Inputs:
cal_file_struct *file_ptr - pointer to structure containing file info.
int i - index (starting at zero) of the sample to be read.
Returns:
1 for success, 0 on read error.
Globals:
static int got_lib_od_and_chems;      // 1 if the file has been read and stored
                                      // in lib_od_and_chems, 0
otherwise.
Notes:
The file must first be read sequentially, in order to properly skip deleted
samples. Random access to samples is allowed only from data stored in memory.
*******************************************************************************/
{
        static int ipos;
        if(got_lib_od_and_chems == 0) {
                if(i == 0) lseek(file_ptr->handle, SAMP_START_OFFSET, SEEK_SET);
                assert(ipos == i);      // Assure that the first read is sequential.
                ipos = i+1;
        }
        return(my_read_next_sample(file_ptr, i));
}

int get_ns(cal_file_struct *file_ptr)
/*******************************************************************************
Inputs:
cal_file_struct *file_ptr - pointer to structure containing file info.
Returns:
int number of samples, obtained from the cal_file_struct
*******************************************************************************/
{
        return(file_ptr->header.samples);
}

int get_nod(cal_file_struct *file_ptr)
/*******************************************************************************
Inputs:
cal_file_struct *file_ptr - pointer to structure containing file info.
Returns:
```

721

```
int number of X datapoints, obtained from the cal_file_struct
*******************************************************************************/
{
        return(file_ptr->header.no_datapoints);
}

float med(float n1, float n2, float n3)
/*******************************************************************************
Inputs:
float n1 - first of three numbers
float n2 - second of three numbers
float n3 - third of three numbers
Returns:
float median of n1, n2, and n3
*******************************************************************************/
{
        if(n1 < n3) {
                if(n2 < n1) return(n1);
                if(n2 > n3) return(n3);
                return(n2);
        } else {
                if(n2 < n3) return(n3);
                if(n2 > n1) return(n1);
                return(n2);
        }
}

int compare_float(const void *e1, const void *e2)
/*******************************************************************************
Inputs:
const void *e1 - pointer to first value to compare
const void *e2 - pointer to second value to compare
Returns:
int -1 if *e1 < *e2, 0 if *e1 == *e2, 1 if *e1 > *e2
*******************************************************************************/
{
        float diff;

        diff = *(float *)e1 - *(float *)e2;
        if(diff < 0.0) return(-1);
        if(diff > 0.0) return(1);
        return(0);
}
```

```
static int find_region_endpoints(float *sample, int nod, int *endpoints)
/*****************************************************************************
Inputs:
float *sample - array[nod] of log(1/R) or 1st derivative spectrum
int nod - number of datapoints
Outputs:
int *endpoints - array[nod/2] - local minima (log(1/R)) or zero crossings ( 1st derivate) of sample
Returns:
int number of endpoints found
Globals:
int Correlate_by_peaks;      // 1 if correlation matches should be pooled from the
                             // local peaks (defined from local minimum to local
                             // minimum), 0 otherwise.
int Ider;        // Derivative number (0 => none, 1 = first, etc).
Notes:
if Correlate_by_peaks == 1, find the local minima (log(1/R) or zero crossings
(low to high) for the first derivative. The thought here is that spectra that
differ primarily in the height of absorption peaks (such as water or oil) should
be given high correleations so that they are selected for the calibration set.
*****************************************************************************/
{
        int j, npts;

        endpoints[0] = 0;
        npts = 1;
        if(Correlate_by_peaks == 0) {
                endpoints[0] = 1;       // Skip first point (might be particle size score!)
                goto done;
        }
        for(j=1;j<nod-1;j++) {
                if(Ider == 0) {
                        if(sample[j-1] > sample[j] && sample[j] < sample[j+1]) endpoints[npts++]
= j;
                }
                if(Ider == 1) {
                        if(sample[j] < 0.0 && sample[j+1] >= 0.0) endpoints[npts++] = j;
                }
        }
done:
        endpoints[npts] = nod;
        return(npts);
}
```

```
static void correlate(float *sample, float *od, float *weights, int nuse, double *xx, double *xy,
double *yy)
/*****************************************************************************
Inputs:
float *sample - array[nuse] containing sample datapoints to be matched
float *od - array[nuse] containing library sample to be correleated
float *weights - array[nuse] containing wavelength weights
int nuse - number of datapoints
Outputs:
double *xx - weighted sum of squared sample datapoints
double *xy - weighted (sample, od) covariances
double *yy - weighted sum of squared od datapoints
Notes:
This may be called one peak at a time, with the calling routine accumulating
the xx, xy, and yy values for a pooled correlation. Both sample and od are
mean centered before the sums are computed.
*****************************************************************************/
{
	double sumx, sumy, sumwts, tx, ty, ssxx, ssxy, ssyy;
	int j;

	sumx = sumy = sumwts = 0.0;
	ssxx = ssxy = ssyy = 0.0;
	if(nuse <= 3) goto done;
	for(j=0;j<nuse;j++) {
		sumx += sample[j]*weights[j];
		sumy += od[j]*weights[j];
		sumwts += weights[j];
	}
	if(sumwts == 0.0) goto done;
	sumx /= sumwts;
	sumy /= sumwts;

	ssxx = ssxy = ssyy = 0.0;
	for(j=0;j<nuse;j++) {
		tx = sample[j]*weights[j] - sumx;
		ty = od[j]*weights[j] - sumy;
		ssxx += tx*tx;
		ssxy += tx*ty;
		ssyy += ty*ty;
	}
done:
	*xx = ssxx;
```

```
        *xy = ssxy;
        *yy = ssyy;
}

int make_target(float *sample, int nod, int nave, float *weights, double *target)
/*****************************************************************************
Inputs:
float *sample - array[nod] of datapoints of sample to be weighted and reduced
int nod - number of datapoints
int nave - number of points to average together
float *weights - wavelength weights (optional)
Outputs:
double *target - weighted and reduced sample spectrum
Returns:
int - number of used datatpoints
Globals:
int Nuse;      // Maximum number of final datapoints, useful for fourier transforms
*****************************************************************************/
{
        int j, jj, k;
        double sum, sumwts;

        for(j=jj=0;j<=nod-nave;j+=nave) {
                sum = sumwts = 0.0;
                for(k=j;k<j+nave;k++) {
                        sum += sample[k]*weights[k];
                        sumwts += weights[k];
                }
                if(sumwts != 0.0) target[jj++] = sum;
                if(Nuse > 0 && jj >= Nuse) break;
        }
        return(jj);     // Number of used datapoints.
}

int compare_double(const void *p1, const void *p2)
/*****************************************************************************
const void *p1 - pointer to first double value
const void *p2 - pointer to second double value
Returns:
int -1 if *p1 < *p2, 0 if *p1 == *p2, 1 if *p1 > *p2
*****************************************************************************/
{
        double diff;
```

```
        diff = *(double *)p2 - *(double *)p1;   // Reversed order to get biggest at front.
        if(diff < 0.0) return(-1);
        if(diff > 0.0) return(1);
        return(0);
}

void get_msc_limits(float *x, int nx, float *xmin, float *xmax)
/*****************************************************************************
Inputs:
float *x - array[nx] of initial weights, such as (sd/xbar)^2
int nx - number of weights in x[]
Outputs:
float *xmin - initial weight value to get weight 0.0
float *xmax - initial weight value to get weight 1.0
*****************************************************************************/
{
        int j;
        float x33, x67, pnt;
        float *temp;
/*
Set limit equal to the F(.67) + F(.67) - F(.33).
*/
        temp = (float *)my_malloc(nx*sizeof(temp[0]));
        memcpy(temp, x, nx*sizeof(temp[0]));
        qsort(temp, nx, sizeof(temp[0]), compare_float);
        *xmin = temp[0];
        *xmax = temp[nx-1];
        if(nx < 4) return;
        pnt = nx-1;
        pnt /= 3;
        j = (int)pnt;
        x33 = temp[j] + (temp[j+1]-temp[j])*(pnt-j);
        pnt *= 2;
        j = (int)pnt;
        x67 = temp[j] + (temp[j+1]-temp[j])*(pnt-j);
        pnt = x67 + x67 - x33;
        if(pnt < *xmax) *xmax = pnt;
        my_free(temp);
}

int scale_weights(float *weights, int nod)
/*****************************************************************************
Inputs:
```

```
float *weights - array[nod] containing initial weights, such as (sd/xbar)^2
int nod - number of initial weights in weights[]
Returns:
int - number of nonzero weights
Notes:
The weights are first inverted so that wtmax => 0.0 and wtmin => 1.0
THe weights are then scaled to have average value 1.0
*****************************************************************************/
{
        int j, n;
        float wtmin, wtmax, sumwt;

        get_msc_limits(weights, nod, &wtmin, &wtmax);
/*
Scale the weights from 0.0 to 1.0
*/
        n = nod;
        sumwt = 0.0;
        for(j=0;j<nod;j++) {
                weights[j] = (wtmax - weights[j]) / (wtmax - wtmin);
                if(weights[j] < 0.0) {
                        weights[j] = 0.0;
                        n--;
                } else {
                        sumwt += weights[j];
                }
        }
/*
Scale the weights to have an average of 1.0
*/
        sumwt = nod/sumwt;
        for(j=0;j<nod;j++) weights[j] *= sumwt;
        return(n);
}

float *get_msc_mean(int ns, int nod, int *positions)
/*****************************************************************************
Inputs:
int ns - number of samples
int nod - number of datapoints
int *positions - array[ns] of sample positions (zero based) to use
Returns:
float * - pointer to the average spectrum of samples specified in *positions
```

```
Globals:
cal_file_struct lib_file;        // Info about the library file
******************************************************************************/
{
        int i, j;
        float *my_msc_mean;
/*
Get the mean.
*/
        my_msc_mean = (float *)my_malloc(nod*sizeof(my_msc_mean[0]));
        memset(my_msc_mean, 0, nod*sizeof(my_msc_mean[0]));
        for(i=0;i<ns;i++) {
                my_read_sample_i(&lib_file, positions[i]);
                for(j=0;j<nod;j++) my_msc_mean[j] += lib_file.od[j];
        }
        for(j=0;j<nod;j++) my_msc_mean[j] /= ns;
        return(my_msc_mean);
}

#define XMIN .001
float *get_msc_weights(int ns, int nod, float *msc_mean, int *positions,
        instrument_header *insthdr, int *nwts)
/******************************************************************************
Inputs:
int ns - number of samples
int nod - number of datapoints
float *msc_mean - array[nod] of average spectra used to compute standard deviation
int *positions - array[ns] of file positions of samples to use
instrument_header *insthdr - pointer to instrument header, used for segment info
Outputs:
int *nwts - pointer to number of nonzero weights
Returns:
float * - array[nod] of final msc weights
Globals:
cal_file_struct lib_file;        // Info about the library file
******************************************************************************/
{
        int i, j, k;
        float xmin, offset;
        float *my_weights;
/*
Get the (corrected) sums of squares
*/
```

```
	my_weights = (float *)my_malloc(nod*sizeof(my_weights[0]));
	memset(my_weights, 0, nod*sizeof(my_weights[0]));
	for(i=0;i<ns;i++) {
		my_read_sample_i(&lib_file, positions[i]);
		for(j=0;j<nod;j++) my_weights[j] +=
(lib_file.od[j]-msc_mean[j])*(lib_file.od[j]-msc_mean[j]);
	}
/*
Compute initial my_weights as (sd / mean)^2.
Force the minimum mean value to be at least XMIN.
*/
	xmin = msc_mean[0];
	for(j=0;j<nod;j++) if(msc_mean[j] < xmin) xmin = msc_mean[j];
	if(xmin > XMIN) offset = 0.0;
	else offset = XMIN - xmin;
	for(j=0;j<nod;j++) my_weights[j] /= (msc_mean[j]+offset)*(msc_mean[j]+offset);
/*
Invert and scale the weights one segment at a time.
*/
	for(i=j=k=0;j<insthdr->nseg;k+=insthdr->npps[j++]) {
		i += scale_weights(my_weights+k, insthdr->npps[j]);
	}
	*nwts = i;
	return(my_weights);
}

int find_similar_samples(float *sample, int nod, int nod2, int max_pos, float *weights,
int ivar, int ider, int gap, int np1, int np2, double *rmax, double *rmin, double *sample_weights)
/*******************************************************************************
Inputs:
float *sample - array[nod] of the sample that needs a calibration
int nod - number of datapoints in sample[]
int nod2 - number of valid datapoints after math treatment
int max_pos - maximum number of selected calibration samples
float *weights - array[nod] of wavelength weights
int ivar - index of file constituent currently being calibrated
int ider - derivative number
int gap - difference in the index numbers of values subtracted to form derivatives
int np1 - number of points in the first running average
int np2 - number of points in the second running average (usually just a 1)
Outputs:
double *rmax - pointer to highest correlation (perfect matches are excluded)
double *rmin pointer to lowest correlation of a selected sample
```

IS 29

```
double *sample_weights - options sample weights based on correlation values
Returns:
int - number of selected calibration samples
Globals:
cal_file_struct lib_file;       // Info about the library file
int ns; // number of samples in library file
int nlose;      // number of datapoints lost due to math treatment
static int got_lib_od_and_chems;     // 1 if the file has been read and stored
                                                          // in lib_od_and_chems, 0
otherwise.
float R_sq_cutoff;    // minimum r_squared value of selection in a calibration set
int Use_sample_weights;     // 1 to use sample weights, 0 otherwise
int Scatter;    // scatter options (0 = none, etc.)
float *msc_mean;      // pointer to array of msc target (usually an average spectrum)
float *msc_weights;  // pointer of array of msc weights (for weighted msc)
int Nave;       // number of math treated datapoints to average for the final set.
static double **x;      // pointer to array[][] to hold spectral data
static double *y;       // pointer to array[] to hold constituent data
******************************************************************************/
{
        int i, ipt1, k, nn, n_regions, npos;
        int *endpoints, *positions;
        double xx, xy, yy, ssxx, ssxy, ssyy;
        rr_struct *rr;

        positions = (int *)my_malloc(ns*sizeof(*positions));
        rr = (rr_struct *)my_malloc(ns*sizeof(rr_struct));
        endpoints = (int *)my_malloc(nod*sizeof(*endpoints)/2);
        n_regions = find_region_endpoints(sample, nod-nlose, endpoints);
/*
Loop through all the library samples, computing correlations to the target sample
*/
        for(i=0;i<ns;i++) {
                if(i == 0) my_read_sample_i(&lib_file, 0);
                else      my_read_next_sample(&lib_file, i);
                setup(lib_file.od, lib_file.od, nod, ider, gap, np1, np2);
                rr[i].index = i;
                ssxx = ssxy = ssyy = 0.0;
                if(lib_file.chems[ivar] != MISSING) {
                        for(k=0;k<n_regions;k++) {
                                ipt1 = endpoints[k];
                                nn = endpoints[k+1] - ipt1;
                                correlate(sample+ipt1, lib_file.od+ipt1, weights+ipt1, nn, &xx,
```

```
&xy, &yy);
                                ssxx += xx;
                                ssxy += xy;
                                ssyy += yy;
                        }
                        ssxx *= ssyy;
                }
                rr[i].r2 = (ssxx == 0.0 ? 0.0 : ssxy*ssxy/ssxx);
        }
        got_lib_od_and_chems = 1;
        my_free(endpoints);
/*
Sort the correlations and eliminate any perfect matches (too good to be true!)
Store the postions of the best matches.
If Use_sample_weights != 0, scale the correlations to form sample weights.
*/
        qsort(rr, ns, sizeof(rr_struct), compare_double);
        k = 0;
        while(rr[k].r2 == 1.0) k++;
        (*rmax) = rr[k].r2;
        for(i=0;i<max_pos&&(rr[i+k].r2>=R_sq_cutoff);i++) {
                positions[i] = rr[i+k].index;
                sample_weights[i] = (Use_sample_weights ?
(rr[i+k].r2-R_sq_cutoff)/(1.00-R_sq_cutoff) : 1.0);
        }
        npos = i;
        (*rmin) = rr[i+k-1].r2;
        my_free(rr);
/*
If multiplicative scatter correction is needed, get msc_mean and msc_weights
now from the selected calibration samples.
*/
        if(Scatter == 4 || Scatter == 5 || Scatter == 6) {
                if(msc_mean != NULL) my_free(msc_mean);
                msc_mean = get_msc_mean(npos, nod, positions);
                if(Scatter == 5) {
                        if(msc_weights != NULL) my_free(msc_weights);
                        msc_weights = get_msc_weights(npos, nod, msc_mean, positions,
                                &lib_file.insthdr, &i);
                }
        }
/*
Reread the selected samples, apply scatter correction and math treatment and
```

```
store the samples in the x and y arrays.
*/
        for(i=0;i<npos;i++) {
                my_read_sample_i(&lib_file, positions[i]);
                compute_math(lib_file.od, nod, Scatter, ider, gap, np1, np2, &lib_file.insthdr);
                make_target(lib_file.od, nod2, Nave, weights, x[i]);
                y[i] = lib_file.chems[ivar];
        }
        my_free(positions);
        return(npos);
}

void get_limits(float *x, int nx, float *low_lim, float *high_lim)
/******************************************************************************
Inputs:
float *x - array[nx] of data to be converted into sample weights
int nx - number of datapoints in x[]
Outputs:
float *low_lim - value to be given weight 0.0
float *high_lim - value to be given weight 1.0
******************************************************************************/
{
        int j;
        float x25, x50, pnt, q_range2;
        float *temp;
/*
Set low and high limits equal to F(.50)-2F(.25) and 3F(.50) - 2F(.25)
*/
        temp = (float *)my_malloc(nx*sizeof(temp[0]));
        memcpy(temp, x, nx*sizeof(temp[0]));
        qsort(temp, nx, sizeof(temp[0]), compare_float);
        *low_lim = temp[0];
        *high_lim = temp[nx-1];
        if(nx < 4) return;
        pnt = nx;
        pnt /= 4;
        pnt -= 1;
        j = (int)pnt;
        x25 = temp[j] + (temp[j+1]-temp[j])*(pnt-j);
        pnt = nx;
        pnt /= 2;
        pnt -= 1;
        j = (int)pnt;
```

18 32

```
        x50 = temp[j] + (temp[j+1]-temp[j])*(pnt-j);
        q_range2 = (x50 - x25)*2;
        *low_lim = x50 - q_range2;
        pnt = q_range2*2 + x50;
        if(pnt < *high_lim) *high_lim = pnt;
        my_free(temp);
}

void convert_noise_to_weights(float *noise, int nod, float *weights)
/****************************************************************************
float *noise - array[nod] of noise values to be converted into wavelength weights
int nod - number of datapoints in noise[]
Outputs:
float *weights - final wavelength weights
****************************************************************************/
{
        int j;
        float low_lim, high_lim;
/*
Get "reasonable" low and high limits based on quartiles.
Create weights with any noise values above high_lim having weight 0.0.
*/
        get_limits(noise, nod, &low_lim, &high_lim);
        for(j=0;j<nod;j++) weights[j] = (noise[j] < high_lim ? 1.0 : 0.0);
}

void compute_wavelength_weights(float *sample, int nod, int use_weights, int npos, float
*weights)
/****************************************************************************
float *sample - array[nod] of sample for which weight are needed
int nod - number of datapoints in sample[]
int use_weights - 1 to make wavelength weights, 0 otherwise
int npos - number of selected samples
Outputs:
float *weights - array[nod] of final wavelength weights based on spectral noise
Globals:
int Nuse;          // Maximum number of final datapoints, useful for fourier transforms
static double **x;      // pointer to array[][] to hold spectral data
static double *y;       // pointer to array[] to hold constituent data
****************************************************************************/
{
        int i, j, nn;
        float *noise;
```

```
	double tx, ty, *xbar, ybar, *xx, *xy, yy;

	if(use_weights == 0 || npos == 0) {
		for(i=0;i<nod;i++) weights[i] = 1.0;
		return;
	}
/*
Wavelength weights option 1:
Compute spectral noise by subtracting a spectrum from the spectrum smoothed by
the savitsky_golay method.
Then smooth the spectral noise with a major fourier transform smooth and convert
the smoothed noise into wavelength weights.
*/
	if(use_weights == 1) {
		nn = 1;
		while(nn < nod+2*64) nn <<= 1;
		noise = (float *)my_malloc(nn*sizeof(noise[0]));
		savitsky_golay(sample, nod, 5, 3, noise);	// Moderate smooth to find noise.
		for(i=0;i<nod;i++) noise[i] = fabs(noise[i]-sample[i]);

		smooft(noise-1, nod, 32.0);	// Major smooth to form weights.
		convert_noise_to_weights(noise, nod, weights);
		my_free(noise);
	}
/*
Wavelength weights option 2:
Get the individual datapoint correlations with y.
Set the weights equal to the correlations times the datapoint index divided 2
This is designed to follow a fourier transform math treatment, where spectral
noise cannot be computed as in options 1!
*/
	if(use_weights == 2) {
		xbar = (double *)my_malloc(nod*sizeof(*xbar));
		memset(xbar, 0, nod*sizeof(*xbar));
		ybar = 0.0;
		for(i=0;i<npos;i++) {
			for(j=0;j<Nuse;j++) xbar[j] += x[i][j];
			ybar += y[i];
		}
		for(j=0;j<Nuse;j++) xbar[j] /= npos;
		ybar /= npos;
		xx = (double *)my_malloc(Nuse*sizeof(*xx));
		memset(xx, 0, Nuse*sizeof(*xx));
```

```
			xy = (double *)my_malloc(Nuse*sizeof(*xy));
			memset(xy, 0, Nuse*sizeof(*xy));
			yy = 0.0;
			for(i=0;i<npos;i++) {
				ty = y[i]-ybar;
				for(j=0;j<Nuse;j++) {
					tx = x[i][j]-xbar[j];
					xx[j] += tx*tx;
					xy[j] += tx*ty;
				}
				yy += ty*ty;
			}
			for(j=0;j<Nuse;j++) {
				weights[j] = (j/2)*xy[j]*xy[j]/(xx[j]*yy);
			}
			my_free(xy);
			my_free(xx);
			my_free(xbar);
		}
}

void copy_selected_samples(int *positions, int npos, char *file_out)
/******************************************************************************
Inputs:
int *positions - array[npos] of selected sample index numbers (0 based)
int npos - number of values in positions[]
char *file_out - pointer to name of file to receive the selected samples.
******************************************************************************/
{
	int i, handle;
	cal_file_struct library_file;

	handle = open(file_out, O_CREAT|O_BINARY|O_RDWR, S_IWRITE|S_IREAD);
	library_file.header.samples = npos;
	library_file.header.deleted = 0;
	write(handle, &library_file.header, sizeof(general_fileheader));
	write(handle, &library_file.insthdr, sizeof(instrument_header));
	write(handle, &library_file.vnames, sizeof(constituent_array));
	for(i=0;i<npos;i++) {
		my_read_sample_i(&library_file, positions[i]);
		write(handle, &library_file.samhdr, sizeof(sample_header));
		write(handle, library_file.od, library_file.od_read_size);
		write(handle, library_file.chems, MAXCONSTITS*sizeof(library_file.chems[0]));
```

```
                strcpy(library_file.sample_nos[i].sample_no, library_file.samhdr.sample_no);
                library_file.sample_nos[i].sequence = library_file.samhdr.sequence;
                library_file.sample_nos[i].delete_flag = 0;
        }
        write(handle, library_file.sample_nos, npos*sizeof(sample_no_rec));
        close(handle),handle = -1;
}

void read_opts(void)
/*****************************************************************************
Notes:
This routine reads the file "options.dat", which should consist of lines of
keyword=value. The keywords can be present in any order.
Globals:
int Ivar, Max_samps, Min_samps, Minimum_factors, Samples_per_factor, Correlate_by_peaks,
Scatter;
int Ider, Gap, Smooth, Nave, Nuse, Use_wavelength_weights, Use_sample_weights,
Max_elim_passes, Full_output;
float R_sq_cutoff, Ssx_factor, Y2_factor, Cutoff_ratio;
int nlose;        // number of datapoints lost due to math treatment
char anl_name[80];
*****************************************************************************/
{
        int i;
        FILE *fp;
        char string[128], *value;
        char *keywords[] = {
                "VARIABLE_NUMBER",
                "REQUESTED_SAMPLES",
                "MINIMUM_SAMPLES",
                "SAMPLES_PER_FACTOR",
                "MINIMUM_FACTORS",
                "R_SQUARED_CUTOFF",
                "CORRELATE_BY_PEAKS",
                "SCATTER",
                "DERIVATIVE",
                "GAP",
                "SMOOTHING",
                "INCREMENT",
                "NUSE",
                "USE_WAVELENGTH_WEIGHTS",
                "USE_SAMPLE_WEIGHTS",
                "SSX_FACTOR",
```

```
        "Y2_FACTOR",
        "MAX_ELIM_PASSES",
        "CUTOFF_RATIO",
        "FULL_OUTPUT",
        "ANL_FILENAME",
        ""
};

Ivar = -1;
fp = fopen("options.dat", "rt");
while(1) {
        if(fgets(string, 128, fp) == NULL) break;
        value = strchr(string, '=');
        if(value == NULL) continue;
        *value++ = '\0';        /* break into two strings */
        for(i=0;keywords[i][0]!=0;i++) {
                if(stricmp(string, keywords[i]) == 0) {
                        switch(i) {
                                case 0: sscanf(value, "%d", &Ivar); Ivar--; break;
                                case 1: sscanf(value, "%d", &Max_samps); break;
                                case 2: sscanf(value, "%d", &Min_samps); break;
                                case 3: sscanf(value, "%d", &Samples_per_factor); break;
                                case 4: sscanf(value, "%d", &Minimum_factors); break;
                                case 5: sscanf(value, "%g", &R_sq_cutoff); break;
                                case 6: sscanf(value, "%d", &Correlate_by_peaks); break;
                                case 7: sscanf(value, "%d", &Scatter); break;
                                case 8: sscanf(value, "%d", &Ider); break;
                                case 9: sscanf(value, "%d", &Gap); break;
                                case 10:sscanf(value, "%d", &Smooth); break;
                                case 11:sscanf(value, "%d", &Nave); break;
                                case 12:sscanf(value, "%d", &Nuse); break;
                                case 13:sscanf(value, "%d", &Use_wavelength_weights);
break;
                                case 14:sscanf(value, "%d", &Use_sample_weights); break;
                                case 15:sscanf(value, "%g", &Ssx_factor); break;
                                case 16:sscanf(value, "%g", &Y2_factor); break;
                                case 17:sscanf(value, "%d", &Max_elim_passes); break;
                                case 18:sscanf(value, "%g", &Cutoff_ratio); break;
                                case 19:sscanf(value, "%d", &Full_output); break;
                                case 20:sscanf(value, "%s", anl_name); break;
                        } /* switch */
                        break;  /* exit for loop and read another line */
                } /* if */
```

```
            } /* for */
        } /* while */
        fclose(fp);
        if(Scatter < 0 || Scatter > 6) Scatter = 0;
        nlose = Ider*Gap+Smooth-1;
}

void compute_math(float *od, int nod, int scatter_option, int ider,
        int gap, int smooth, int smooth2, instrument_header *insthdr)
/******************************************************************************
Inputs:
float *od - array[nod] of datapoints to be scatter corrected and derivatized
int nod - number of datapoints in od[]
int scatter_option - scatter option
int ider - derivative number (0 = none, 1 = first, etc)
int gap - difference between datapoint indices being subtracted to form derivatives
int smooth - number of datapoints in the first running average
int smooth2 - number of datapoints in the second running average (usually 1)
instrument_header *insthdr - pointer to instrument header, to get segment info
Globals:
float *msc_mean;      // pointer to array of msc target (usually an average spectrum)
float *msc_weights;   // pointer of array of msc weights (for weighted msc)
Notes:
The scatter corrected and derivatized spectrum is returned in od[].
******************************************************************************/
{
        int j, k;
/*
Do the scatter correction one segment at a time.
*/
        if(scatter_option) {
                for(j=k=0;j<insthdr->nseg;k+=insthdr->npps[j++]) {
                        scatter_correction(od+k, od+k, insthdr->npps[j],
                                scatter_option, (scatter_option>=4 ? msc_mean+k : NULL),
(scatter_option==5 ? msc_weights+k : NULL));
                }
        }
        setup(od, od, nod, ider, gap, smooth, smooth2);
}

int store_analysis(int handle, char *sample_number, equation_string vnames[], float yps[], float
hps[], int nvar, FLOAT hp, FLOAT nh)
/******************************************************************************
```

```
Inputs:
int handle - handle of file to receive the predicted values
char *sample_number - sample number of current sample
equation_string vnames[] - array[32] of constituent names, each 15 chars max
float yps[] - array[32] containing predicted values
float hps[] - array[32] containing 'H' values for each constituent prediction
int nvar - number of predicted values
FLOAT hp - general 'H' value for the whole spectrum
FLOAT nh - general neighbor 'H' value for the whole spectrum
Returns:
int 0 for success, -1 for write failure
Globals:
anl_sample sample_rec;        // struct for predicted value storage
*****************************************************************************/
{
        int i, size;
        anl_sample_value sample_values[MAXCONSTITS];
        struct dosdate_t datep;

        if(handle <= 0) return(0);
        strcpy(sample_rec.sample_no, sample_number);
        _dos_getdate(&datep);
        sample_rec.date = (((((datep.year-1980)<<4)+datep.month)<<5)+datep.day);
        sample_rec.time = time(NULL);
        if(write(handle, &sample_rec, sizeof(anl_sample)) != sizeof(anl_sample)) goto
write_error;
        sample_rec.global_h = hp;
        sample_rec.neighbor_h = nh;

        size = ROUNDUP(sample_rec.no_variables*sizeof(anl_sample_value));
        memset(sample_values, 0, size);
        for(i=0;i<nvar;i++) {
                strcpy(sample_values[i].constituent, vnames[i]);
                sample_values[i].value = yps[i];
                sample_values[i].h = hps[i];
        }
        if(write(handle, sample_values, size) != size) goto write_error;
        return(0);
write_error:
        printf("Error writing to analysis file");
        return(-1);
} /* store_anlysis */
```

```
char *name_only(char *filename)
/*****************************************************************************
Inputs:
char *filename - pointer to null terminated filename string
Returns:
char * pointer to the beginning of the name field, after the drive and path
*****************************************************************************/
{
	char *name;
	name=filename;
	do{
		if(*filename==':' || *filename=='\\')name=filename+1;
	}while(*(++filename));
	return(name);
}

void main(int argc, char *argv[])
/*****************************************************************************
Inputs:
int argc - count of command line arguments, including the program name as the first
char *argv[] array of pointers to the command line arguments.
Notes:
This program looks for the filename of the target samples and the filename of
the library samples when the program name is enterred from DOS.
If these filenames are not found in the command line string, they will be
obtained from the user at run time.
*****************************************************************************/
{
	float *sample, *sample_sav;
	float *wavelength_weights;
	float chems[32], y_pred;
	double *target, diff, rmax, rmin, sum[32], ss[32];
	double **x_local;
	FLOAT **eigenvectors;
	FLOAT *xx_mean, *xx_inv;
	FLOAT score, hp, nh, asdf;
	double *sample_weights;
	double **w, **c;
	void *storage;
	int input_handle, i, j, k, ii, nn[32], npos, max_fact, nod2, ivar, nmax, npca;
	char input_name[80], library_name[80];
	equation_string vnames[32];
	float yps[32], hps[32];
```

```
        sample_header samphdr;
        struct dosdate_t datep;

        signal(SIGFPE, fp_error_handler);
        signal(SIGINT, ctrl_c_handler);

        Argc = argc-1;
        Argv = argv+1;

        read_opts();
/*
Get the input filename.
*/
        get_filename("The input .CAL filename = ", input_name, ".CAL", 0);
        input_handle = open(input_name, O_BINARY|O_RDONLY);
        if(input_handle < 0) {
                printf("Cannot open %s\n", input_name);
                return;
        }
        read(input_handle, &header, sizeof(general_fileheader));
        lseek(input_handle, sizeof(instrument_header), SEEK_CUR);
        read(input_handle, vnames, sizeof(constituent_array));

        sample = (float *)my_malloc(ROUNDUP(header.no_datapoints*sizeof(sample[0])));
        sample_sav = (float
*)my_malloc(ROUNDUP(header.no_datapoints*sizeof(sample_sav[0])));
/*
Get the library filename.
*/
        get_filename("The library .CAL filename = ", library_name, ".CAL", 0);
        if(my_open_cal_file(library_name, &lib_file) < 0) return;
/*
Open the optional analyses filename (from options.dat).
*/
        if(anl_name[0]) {
                anl_handle = open(anl_name, O_CREAT|O_BINARY|O_RDWR,
S_IWRITE|S_IREAD);
                if(anl_handle > 0) {
                        memcpy(&anl_header, &header, sizeof(general_fileheader));
                        anl_header.filetype = ANL_TYPE;
                        anl_header.samples = anl_header.deleted = 0;
                        _dos_getdate(&datep);
                        if(Ivar >= 0) anl_header.constituents = 1;
```

```
                        anl_header.date_created =
 (((((datep.year-1980)<<4)+datep.month)<<5)+datep.day);
                        anl_header.time = time(NULL);
                        write(anl_handle, &anl_header, sizeof(general_fileheader));
                        memset(&sample_rec, 0, sizeof(anl_sample));
                        sample_rec.eqa_stamp.time = header.time;
                        sample_rec.eqa_stamp.date = header.date_created;
                        strcpy(sample_rec.eqa_stamp.equation_file, name_only(input_name));
                        sample_rec.no_variables = anl_header.constituents;
                }
        }

        ns = get_ns(&lib_file);
        nod = get_nod(&lib_file);
        nv = (nod-nlose)/Nave;
        if(Nuse > 0 && Nuse < nv) nv = Nuse;
        max_fact = (Max_samps+Samples_per_factor-1)/Samples_per_factor;

        lib_od_and_chems = (float **)my_malloc(ns*sizeof(float *));
        for(i=0;i<ns;i++) lib_od_and_chems[i] = (float *)my_malloc((nod+32)*sizeof(float));
        lib_sample_nos = (sample_no_rec *)my_malloc(ns*sizeof(sample_no_rec));

        x = (double **)my_malloc((Max_samps+1)*sizeof(x[0]));
        y = (double *)my_malloc((Max_samps+1)*sizeof(y[0]));
        for(i=0;i<Max_samps+1;i++) x[i] = (double *)my_malloc(nv*sizeof(x[0][0]));
        target = (double *)my_malloc(nv*sizeof(target[0]));
        wavelength_weights = (float
*)my_malloc(header.no_datapoints*sizeof(wavelength_weights[0]));
        sample_weights = (double *)my_malloc(Max_samps*sizeof(sample_weights[0]));
        x_local = (double **)my_malloc((Max_samps+1)*sizeof(x_local[0]));
        for(i=0;i<=Max_samps;i++) x_local[i] = (double *)my_malloc(nv*sizeof(x_local[0][0]));

        nmax = (Max_samps > nv ? Max_samps : nv);
        eigenvectors = (FLOAT **)my_malloc(nmax*sizeof(*eigenvectors));
        for(i=0;i<nmax;i++) eigenvectors[i] = (FLOAT *)my_malloc(nv*sizeof(**eigenvectors));
        xx_mean = (FLOAT *)my_malloc(nv*sizeof(*xx_mean));
        xx_inv = (FLOAT *)my_malloc(nv*sizeof(*xx_inv));

        storage = (void *)my_malloc(Max_samps*sizeof(int)
                +
(nv+nv+nv+Max_samps+max_fact+Max_samps+1+max(Max_samps,nv))*sizeof(double)
                + (Max_samps+Max_samps)*sizeof(values)
                + Max_samps*sizeof(char));
```

```
	w = (double **)my_malloc(max_fact*sizeof(w[0]));
	w[0] = (double *)my_malloc(max_fact*nv*sizeof(w[0][0]));
	for(i=1;i<max_fact;i++) w[i] = w[i-1] + nv;
	c = (double **)my_malloc(max_fact*sizeof(c[0]));
	c[0] = (double *)my_malloc(max_fact*nv*sizeof(c[0][0]));
	for(i=1;i<max_fact;i++) c[i] = c[i-1] + nv;
	memset(sum, 0, sizeof(sum));
	memset(ss, 0, sizeof(ss));
	memset(nn, 0, sizeof(nn));
	nod = header.no_datapoints;
	for(i=0;i<header.samples;i++) {
		if(kbhit() && (getch() == 0x1b)) break;
		do {
			read(input_handle, &samphdr, sizeof(sample_header));
			read(input_handle, sample_sav,
ROUNDUP(header.no_datapoints*sizeof(sample[0])));
			read(input_handle, chems, 32*sizeof(chems[0]));
		} while(samphdr.delete_flag);

		memcpy(sample, sample_sav, nod*sizeof(sample[0]));
		setup(sample, sample, header.no_datapoints, Ider, Gap, Smooth, 1);
		nod2 = nod - (Ider*Gap + Smooth + 1 - 2);
		compute_wavelength_weights(sample, nod2, Use_wavelength_weights, 0,
wavelength_weights);
/*
Now loop through the consituents, finding the best samples for each variable.
*/
		for(ivar=0;ivar<lib_file.header.constituents;ivar++) {
			if(Ivar >= 0) ivar = Ivar;
			yps[ivar] = hps[ivar] = 0.0;
			if(chems[ivar] == MISSING) goto loop_bottom;
			memcpy(sample, sample_sav, nod*sizeof(sample[0]));
			setup(sample, sample, header.no_datapoints, Ider, Gap, Smooth, 1);

			npos = find_similar_samples(sample, nod, nod2, Max_samps,
wavelength_weights,
				ivar, Ider, Gap, Smooth, 1, &rmax, &rmin, sample_weights);

			if(Use_wavelength_weights) {
				compute_wavelength_weights(sample, nod2,
Use_wavelength_weights, npos, wavelength_weights);

				npos = find_similar_samples(sample, nod, nod2, Max_samps,
```

```
wavelength_weights,
                                        ivar, Ider, Gap, Smooth, 1, &rmax, &rmin,
sample_weights);
                    }

                    if(npos < Min_samps) {
                            printf("# %3d  ns = %2d\n", i+1, npos);
                            goto loop_bottom;
                    }

                    memcpy(sample, sample_sav, nod*sizeof(sample[0]));     // Copy for math
treatment.
                    compute_math(sample, header.no_datapoints, Scatter, Ider, Gap, Smooth,
1, &lib_file.insthdr);
                    nuse = make_target(sample, nod2, Nave, wavelength_weights, target);

/*
Prepare for the svd.
*/
                    for(ii=0;ii<npos;ii++) {
                            memcpy(eigenvectors[ii], x[ii], nuse*sizeof(**eigenvectors));
                    }
                    for(ii=npos;ii<nuse;ii++) {
                            memset(eigenvectors[ii], 0, nuse*sizeof(**eigenvectors));
                    }
                    npca = make_eig(eigenvectors, npos, nuse, xx_mean, xx_inv, storage);


/*
Neighbor H (And sum of global H's as a check!)
*/
                    nh=9999.0;
                    asdf = 0.0;
                    for(ii=0;ii<npos;ii++) {
                            hp = 0.0;
                            for(k=0;k<npca;k++) {
                                    score = 0.0;
                                    for(j=0;j<nuse;j++) score +=
(x[ii][j]-target[j])*eigenvectors[k][j];
                                    hp += score*score*xx_inv[k];
                            }
                            hp += (1.0 / npos);
                            hp *= (npos / (npca + 1.0));
```

```
                        if(hp < nh) nh = hp;

                        hp = 0.0;
                        for(k=0;k<npca;k++) {
                                score = -xx_mean[k];
                                for(j=0;j<nuse;j++) score += x[ii][j]*eigenvectors[k][j];
                                hp += score*score*xx_inv[k];
                        }
                        hp += (1.0 / npos);
                        hp *= (npos / (npca + 1.0));
                        asdf += hp;
                }
                asdf /= npos;
/*
Global H
*/
                hp = 0.0;
                for(k=0;k<npca;k++) {
                        score = -xx_mean[k];
                        for(j=0;j<nuse;j++) score += target[j]*eigenvectors[k][j];
                        hp += score*score*xx_inv[k];
                }
                hp += (1.0 / npos);
                hp *= (npos / (npca + 1.0));

                y_pred = my_pls(x, y, target, npos, nuse,
(npos+Samples_per_factor-1)/Samples_per_factor, 1, x_local, sample_weights, storage, w, c);
                diff = chems[ivar]-y_pred;

                printf("# %3d  ns:%3d  R2:%5.3lf-%5.3lf  Act:%6.2lf  Pre:%6.2lf
Dif:%6.2lf  H:%5.2lf%5.2lf\n",
                        i+1, npos, rmax, rmin, chems[ivar], y_pred, diff, hp, nh);
                sum[ivar] += diff;
                ss[ivar] += diff*diff;
                nn[ivar]++;
                yps[ivar] = y_pred;
                hps[ivar] = hp;
loop_bottom:
                if(Ivar >= 0) break;
        }
        if(anl_handle > 0) {
                if(Ivar < 0) store_analysis(anl_handle, samphdr.sample_no, vnames, yps,
hps, header.constituents, hp, nh);
```

```
                    else store_analysis(anl_handle, samphdr.sample_no, vnames+Ivar,
yps+Ivar, hps+Ivar, 1, hp, nh);
                }
        }

        if(anl_handle > 0) {
                anl_header.samples = i;
                lseek(anl_handle, 0L, SEEK_SET);
                write(anl_handle, &anl_header, sizeof(general_fileheader));
                close(anl_handle);
        }
        for(ivar=0;ivar<lib_file.header.constituents;ivar++) {
                if(nn[ivar] > 0) {
                        diff = (nn[ivar] > 1 ? (ss[ivar] - sum[ivar]*sum[ivar]/nn[ivar])/(nn[ivar]-1) :
0.0);
                        printf("SEP, bias, SEP(C) for %d out of %d samples = %lf %lf %lf\n",
nn[ivar], header.samples,
                        sqrt(ss[ivar]/nn[ivar]), sum[ivar]/nn[ivar], sqrt(diff));
                }
        }
        close(input_handle);
        my_close_cal_file(&lib_file);
        my_free(lib_sample_nos);
        for(i=0;i<ns;i++) my_free(lib_od_and_chems[i]);
        my_free(lib_od_and_chems);
        if(msc_mean != NULL) my_free(msc_mean);
        if(msc_weights != NULL) my_free(msc_weights);
        my_free(c);
        my_free(w);
        my_free(storage);
        my_free(xx_inv);
        my_free(xx_mean);
        for(i=0;i<nmax;i++) my_free(eigenvectors[i]);
        my_free(eigenvectors);
        for(i=0;i<=Max_samps;i++) my_free(x_local[i]);
        my_free(x_local);
        my_free(sample_weights);
        my_free(wavelength_weights);
        my_free(target);
        my_free(y);
        for(i=0;i<=Max_samps;i++) my_free(x[i]);
        my_free(x);
        my_free(sample_sav);
```

```
        my_free(sample);
}
```

MY_PLS.C

```
#define MY_STUFF
#include <math.h>
#include <stdio.h>
#include <stdlib.h>
#include <string.h>
#include "vectmath.h"

extern int Minimum_factors, Max_elim_passes, Full_output;
extern float Ssx_factor, Y2_factor, Cutoff_ratio;
extern double sumwt, ybar, ysd;
static double x_resid[20], y_pred[20], sd_beta[20];

double make_beta(double **w, double **c, double q, int nv, int iterm, double *btemp, double
*beta)
/*****************************************************************************
This routine forms the final regression coefficients (beta) from the PLS w,
c and q arrays. The routine uses the w and c arrays from all factors.

Inputs:
double **w - array[iterm+1][nv] of the w vectors from PLS
double **c - array[iterm+1][nv] of the c vectors from PLS
double q - current final element of the PLS q vector
int nv - number of NIR variables
int iterm - index (starting with 0) of the latest PLS factor
double *btemp - work array[nv] used to compute beta
Outputs:
double *beta - array[nv] of PLS regression coefficients
Returns:
sum of squared coefficients, used to form the weights for the weighted y_pred.
*****************************************************************************/
{
	int i, j;
	double sum;

	for(j=0;j<nv;j++) btemp[j] = w[iterm][j]*q;
	for(i=iterm-1;i>=0;i--) {
		sum = 0.0;
		for(j=0;j<nv;j++) sum += c[i][j]*btemp[j];
		for(j=0;j<nv;j++) btemp[j] -= w[i][j]*sum;
```

\ 48

```
        }
        sum = 0.0;
        for(j=0;j<nv;j++) {
                beta[j] += btemp[j];
                sum += beta[j]*beta[j];
        }
        return(sum);
}

int pls(double **x, double *y, double *weights, double *target,
        int N, int NN, int P, int K, double *t, double *temp, double *btemp,
        double *xbar, double **w, double **c, double *press, double *beta)
/******************************************************************************
This routine computes the partial least squares(PLS) regression solution
for Beta, where Y = XBeta. The normal algorithm has been modified to
accept sample weights. (All vector math is performed by calls to vector math
routines written in assembler for speed.)
If(NN > N), use the samples from N+1 through NN as a cross validation group.
If(nn == N+1), predict the last sample as the unknown.

Inputs:
double **x - the NIR absorbance data, organized by samples (rows)
double *y - the reference data
double *weights - array[P] of sample weights
double *target - array[P] of unknown sample being predicted (when NN == N+1)
int N - number of samples to use in computing the PLS factors
int NN - number of samples to apply the PLS solution to (samples > N are
                predicted)
int P  - number of NIR variables (wavelengths) to use
int K - number of PLS factors to obtain
double *t - work array[NN] allocated for the t array from the PLS algorithm
double *temp - work array[P] used in applying sample weights
double *btemp - work array[K] used in computing beta coefficients
Outputs:
double *xbar - array[P] of the sample averages
double **c - array[K][P] of the K c vectors from the PLS algorithm
double **w - array[K][P] of the K w vectors from the PLS algorithm
double *press - array[K] for prediction error sums of squares computed
                via cross validation of PLS with 1 through K factors
double *beta - array[P] of regression coefficients
Returns:
- the number of factors computed (usually K, the number requested).
******************************************************************************/
```

```
{
        double ss, ssty, sstt, sum_wts;
        double *wk, *ck;
        int i, j, k;

        memset(beta, 0, P*sizeof(double));
/*
Center the data. (Compute mean from N samples, but apply to NN samples (CAL+CV)
*/
        memset(xbar, 0, P*sizeof(xbar[0]));
        sum_wts = sum_vect(weights, N);
        for(i=0;i<N;i++) {
                memcpy(temp, x[i], P*sizeof(temp[0]));      // Apply sample weights
                mul_const(temp, weights[i], P);
                add_vects(xbar, temp, P);
        }
        mul_const(xbar, 1.0/sum_wts, P);

        memcpy(temp, y, N*sizeof(temp[0]));         // Apply sample weights
        mul_vects(temp, weights, N);
        ybar = sum_vect(temp, N)/sum_wts;

        for(i=0;i<NN;i++) sub_vects(x[i], xbar, P);
        add_const(y, -ybar, NN);
        ysd = ss_vect(y, N);
        ysd = sqrt(ysd/N);

/*
Loop through the K dimensions.
*/
        for(k=0;k<K;k++) {
/*
Compute the weights as W = X'Y and standardize.
*/
                wk = w[k];
                ck = c[k];
                memcpy(temp, y, N*sizeof(temp[0]));         // Apply sample weights
                mul_vects(temp, weights, N);
                for(j=0;j<P;j++) {
                        wk[j] = cov_mat_vect(x, j, temp, N);
                }
                ss = ss_vect(wk, P);
                mul_const(wk, 1.0/sqrt(ss), P);
```

```
/*
Construct a new set of scores as T = XW
*/
                for(i=0;i<NN;i++) t[i] = cov_vects(x[i], wk, P);
                memcpy(temp, t, N*sizeof(temp[0]));         // Apply sample weights
                mul_vects(temp, weights, N);
                sstt = cov_vects(temp, t, N);
                ssty = cov_vects(temp, y, N);
                ss = 0.0;
                for(j=1;j<P;j++) ss += fabs(wk[j]-wk[j-1]);
/*
Form the X and Y matrix residuals.
Accumulate the PRESS values from the predicted samples at the end of the samples.
*/
                for(j=0;j<P;j++) {
                        ck[j] = cov_mat_vect(x, j, temp, N)/sstt;
                }
                for(i=0;i<NN;i++) add_const_times_vect(x[i], -t[i], ck, P);
                add_const_times_vect(y, -ssty/sstt, t, NN);
                if(NN > N) press[k] += ss_vect(y+N, NN-N);
                if(NN == N+1) {
                        x_resid[k] = sqrt(ss_vect(x[N], P)/P);
                        sd_beta[k] = sqrt(make_beta(w, c, ssty/sstt, P, k, btemp, beta)/P);
                        y_pred[k] = -y[N];
                        if(Full_output) printf("%2d %10lf %12.7lf %12.7lf\n", k+1, y_pred[k],
x_resid[k], sd_beta[k]);
                }
        }       /* k loop */
        return(k);
}

int double_compare (const void *p1, const void *p2)
/******************************************************************************
Compare two doubles for qsort().
Inputs:
        const void *p1 - pointer to the first double number
        const void *p2 - pointer to the second doule number
Returns:
        -1 if first number < second number
        0  if first number == second number
        1  if first number > second number
******************************************************************************/
{
```

```
        double diff;
        diff = *(double *)p1 - *(double *)p2;
        if(diff < 0.0) return(-1);
        if(diff > 0.0) return(1);
        return(0);
} /* float_compare */

float my_pls(double **x, double *y, double *target, int N, int P, int K, int NGROUPS,
        double **x_local, double *weights, void *storage, double **w, double **c)
/*****************************************************************************
Inputs:
double **x - array[N][P] of X data
double *y - array[N] of constituent data
double *target - array[P] of X data of new sample to be predicted
int N - number of samples
int P - number X regressors
int K - number of requested PLS factors
int NGROUPS - number of cross validation groups
double **x_local - work array[N][P] - copy of **x to be trashed during PLS
double *weights - array[P] - optional sample weights
void *storage, work array[] to be divided up into various work vectors
Outputs:
double **w - array[K][P] of PLS w vectors
double **c - array[K][P] of PLS c vectors
Returns:
float - predicted value
*****************************************************************************/
{
        int *index;
        int i, ii, igroup, pass, nout, k, K_min, n, n1, n2, ns;
        double *xbar, *t, *press, *y_local, *temp;
        double *btemp, *beta;
        double critical_ssx, critical_y2;
        double sumyp, wt;
        typedef struct {
                double value;
                int index;
        } values;
        values *ssx, *y2;
        char *out;
/*
Divide up the memory from storage
*/
```

152

```
	index = (int *)storage;
	xbar = (double *)(index + N);
	t = (double *)(xbar + P);
	press = (double *)(t + N);
	y_local = (double *)(press + K);
	ssx = (values *)(y_local + N+1);
	y2 = (values *)(ssx + N);
	out = (char *)(y2 + N);
	temp = (double *)(out + N);
	btemp = (double *)(temp + N);
	beta = (double *)(btemp+P);

	memset(out, 0, N*sizeof(out[0]));
	pass = nout = 0;

	do {
/*
Loop through the samples using cross validation groups.
*/
		memset(press, 0, K*sizeof(press[0]));
		memset(ssx, 0, N*sizeof(values));
		memset(y2, 0, N*sizeof(values));
		K_min = K;
		for(igroup=0;igroup<NGROUPS;igroup++) {
/*
Reorder the samples with CAL first and VAL last (to allow vector math).
*/
			n1 = 0;
			ns = n2 = N-nout;
			for(i=ii=0;i<N;i++) {
				if(out[i] == 0) {
					if(NGROUPS <= 1) n = n1++;
					else n = ((ii%NGROUPS) != igroup ? n1++ : --n2);
					ii++;
					memcpy(x_local[n], x[i], P*sizeof(x_local[0][0]));
					y_local[n] = y[i];
					index[n] = i;
				} else {
					ssx[i].value = y2[i].value = 0.0;
					ssx[i].index = y2[i].index = i;
				}
			}
			if(NGROUPS <= 1) n2 = 0;
```

```
/*
Do the pls on the first n samples, predicting the last ns-n samples.
*/
                        if(n1-1 < K_min) K_min = n1-1;
                        pls(x_local, y_local, weights, target, n1, ns, P, K_min, t, temp, btemp,
xbar, w, c, press, beta);
/*
Maintain a list of the samples with large X and Y residuals.
*/
                        for(n=n2;n<ns;n++) {
                                i = index[n];
                                ssx[i].value = ss_vect(x_local[n], P);
                                y2[i].value = y_local[n]*y_local[n];
                                ssx[i].index = y2[i].index = i;
                        }
                }
                if(pass++ == Max_elim_passes) break;
/*
Order the X and Y residual errors and identify outliers.
*/
                qsort(ssx, N, sizeof(ssx[0]), double_compare);
                qsort(y2, N, sizeof(y2[0]), double_compare);
                n1 = nout+(N-nout-1)/2;
                n2 = nout+(N-nout)/2;
                critical_ssx = Ssx_factor*(ssx[n1].value+ssx[n2].value)/2;
                critical_y2 = Y2_factor*(y2[n1].value+y2[n2].value)/2;

                i = nout;
                n = N-1;
                while(ssx[n].value > critical_ssx) {
                        if(Full_output) printf("%3d%16lg%16lg\n", ssx[n].index, ssx[n].value,
critical_ssx);
                        if(out[ssx[n--].index]++ == 0) nout++;
                }

                n = N-1;
                while(y2[n].value > critical_y2) {
                        if(Full_output) printf("%5d%16lg%16lg\n", y2[n].index, y2[n].value,
critical_y2);
                        if(out[y2[n--].index]++ == 0) nout++;
                }
        } while(nout != i);
//for(i=0;i<N;i++) printf("%3d%16lg%3d%10lf%3d\n", i+1, ssx[i].value, ssx[i].index, y2[i].value,
```

λ54

```
y2[i].index);

        if(NGROUPS > 1 && Full_output) {
                for(k=0;k<K_min;k++) printf("%2d %lf\n", k+1. sqrt(press[k]/(N-nout)));
        }
/*
Get a local copy of the samples that have not been eliminated.
*/
        for(i=n=0;i<N;i++) {
                if(out[i] == 0) {
                        memcpy(x_local[n], x[i], P*sizeof(x_local[0][0]));
                        y_local[n] = y[i];
                        index[n++] = i;
                } else {
                        ssx[i].value = y2[i].value = 0.0;
                        ssx[i].index = y2[i].index = i;
                }
        }
/*
Do the pls on all non-eliminated samples, predicting the target sample.
*/
        memcpy(x_local[n], target, P*sizeof(x_local[0][0]));
        y_local[n] = 0.0;
        pls(x_local, y_local, weights, target, n, n+1, P, K_min, t, temp, btemp, xbar, w, c, press,
beta);
/*
If Cutoff_ratio <= 0.0, take a weighted mean of the predicted values from PLS
solutions from the minimum number of PLS factors to the maximum.
Use 1/(SS(x residuals)*SS(beta regression coefficients)) as the weights.
The thought here is that no single solution may be as accurate as an average
solution. The weights are used to de-emphasize solutions that don't explain
enough of the X variation (usually considered to be a sign of underfitting)
and solutions that have large regression coefficients (usually considered
to be a sign of overfitting).
*/
        if(Cutoff_ratio <= 0.0) {
                sumyp=sumwt=0.0;
                for(k=Minimum_factors-1;k<K_min;k++) {
                        wt = (x_resid[k]*sd_beta[k] > 0.0 ? 1/(x_resid[k]*sd_beta[k]) : 0.0);
                        sumyp += y_pred[k]*wt;
                        sumwt += wt;
                }
                sumyp /= sumwt;
```

```
                sumwt /= (K_min-Minimum_factors+1);
                return(sumyp);
        }
/*
Otherwise, if Cutoff_ratio > 0.0, ( > 1.0 to be meaningful), compute the
ratios between the sums of squares of the x residuals for each factor solution
and the solution with one additional factor. Select the number of factors as
the first one for which the SS(i, x residuals) / SS(i+1, x residuals) <=
Cutoff ratio. The thought here is that when PLS stops explaining the
X variation, it has arrived at the appropriatet model.
*/
        for(k=K_min-1;k>=Minimum_factors;k--) {
                if(x_resid[k]*Cutoff_ratio < x_resid[k-1]) break;
        }
        sumwt = (x_resid[k] > 0.0 ? 1/sqrt(x_resid[k]) : 0.0);
        return(y_pred[k]);
}
```

156

We claim:

1. A method of analyzing an unknown material to measure at least one measurable characteristic of said material comprising storing a library of a multiplicity of spectra obtained from the reflectance or transmittance of a multiplicity of sample materials in each of which the value of said measurable characteristic is known, measuring a target spectrum obtained from the transmittance or reflectance of said unknown material, selecting a subset of spectra from said multiplicity which most closely match said target spectrum, determining coefficients of at least one equation which relates said measurable characteristic to values in the target spectrum, said coefficients being determined from said subset of spectra and the known values of said measurable characteristic in said sample materials corresponding respectively to said spectra of said subset, and calculating said measurable characteristic of said unknown material from said coefficients and said target spectrum in accordance with said equation.

2. A method as recited in claim 1, wherein said measurable characteristic is a concentration of a constituent of the material.

3. A method as recited in claim 2, wherein concentrations of a plurality of constituents of said unknown material are measured, the concentrations of said plurality of constituents in each of said sample materials in said library being known, the step of determining coefficients including determining the coefficients in a plurality of equations each relating a different one of said concentrations to values in the target spectrum, the coefficients of said plurality of equations being determined from said subset of spectra and from the known concentrations of constituents in the sample materials corresponding to the spectra of said subset.

4. A method as recited in claim 1, wherein said measurable characteristic comprises a property of said unknown material.

5. A method as recited in claim 1, wherein said subset of spectra is selected by correlating the target spectrum with said multiplicity of spectra in said library.

6. A method as recited in claim 5, wherein said target spectrum is divided into regions each containing a peak and wherein said regions are correlated with corresponding regions in the spectra of said library.

7. A method as recited in claim 1, wherein said coefficients are determined by partial least squares regression from said subset of spectra and from said known values of said measurable characteristic corresponding respectively to the spectra of said subset.

8. A method as recited in claim 1, wherein said spectra are absorbance spectra.

9. A method as recited in claim 1, wherein said spectra are in the near infrared range.

10. A method as recited in claim 1, wherein said spectra are obtained from reflectance measurements on said sample materials and said unknown material.

11. A method as recited in claim 1, further comprising adding the target spectrum to said library of spectra.

* * * * *